(12) United States Patent
Sadeghian Marnani et al.

(10) Patent No.: US 11,320,454 B2
(45) Date of Patent: May 3, 2022

(54) SCANNING PROBE MICROSCOPY SYSTEM FOR AND METHOD OF MAPPING NANOSTRUCTURES ON THE SURFACE OF A SAMPLE

(71) Applicant: Nederlandse Organisatie voor toegepast-natuurwetenschappelijk onderzoek TNO, The Hague (NL)

(72) Inventors: Hamed Sadeghian Marnani, Nootdorp (NL); Aukje Arianne Annette Kastelijn, Schiedam (NL); Peter Martijn Toet, Woerden (NL); Geerten Frans Ijsbrand Kramer, Delfgauw (NL); Evert Nieuwkoop, Pijnacker (NL); Albert Dekker, Delft (NL); Martinus Cornelius Johannes Maria van Riel, 's-Gravenzande (NL); Rik Kruidhof, Eindhoven (NL)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 0 days.

(21) Appl. No.: 16/613,248

(22) PCT Filed: May 14, 2018

(86) PCT No.: PCT/NL2018/050316
§ 371 (c)(1),
(2) Date: Nov. 13, 2019

(87) PCT Pub. No.: WO2018/212645
PCT Pub. Date: Dec. 21, 2008

(65) Prior Publication Data
US 2020/0116754 A1  Apr. 16, 2020

(30) Foreign Application Priority Data
May 15, 2017  (EP) .................................. 17171030

(51) Int. Cl.
*G01Q 20/02* (2010.01)
*G01Q 10/06* (2010.01)
*G01Q 60/24* (2010.01)

(52) U.S. Cl.
CPC .......... *G01Q 20/02* (2013.01); *G01Q 10/065* (2013.01); *G01Q 60/24* (2013.01)

(58) Field of Classification Search
CPC ....... G01Q 10/065; G01Q 20/02; G01Q 60/24
See application file for complete search history.

(56) References Cited

U.S. PATENT DOCUMENTS

2005/0117163 A1* 6/2005 Ng .......................... G01Q 20/02
356/501
2008/0285041 A1* 11/2008 Ocelic .................. G11B 7/1387
356/450

(Continued)

FOREIGN PATENT DOCUMENTS

| EP | 2017599 A2 | 1/2009 |
|---|---|---|
| EP | 2163906 A1 | 3/2010 |
| WO | WO 2009/147450 A1 | 12/2009 |

OTHER PUBLICATIONS

Constant A.J. Putman, et al., "A Theoretical Comparison Between Interferometric and Optical Beam Deflection Technique for the Measurement of Cantilever Displacement in AFM", Ultramicroscopy, Aug. 12, 1991, pp. 1509-1513, vol. 42-44, The Netherlands.

(Continued)

*Primary Examiner* — Wyatt A Stoffa
(74) *Attorney, Agent, or Firm* — Leydig, Voit & Mayer, Ltd.

(57) ABSTRACT

The present document relates to a scanning probe microscopy system and method for mapping nanostructures on the surface of a sample. The system comprises a sample support structure, a scan head including a probe comprising a cantilever and a probe tip, and an actuator for scanning the (Continued)

probe tip relative to the sample surface. The system also includes an optical source, and a sensor unit for obtaining a sensor signal indicative of a position of the probe tip. The sensor unit includes a partially reflecting element for reflecting a reference fraction and for transmitting a sensing fraction of the optical signal. It further includes directional optics for directing the sensing fraction as an optical beam towards the probe tip, and for receiving a reflected fraction thereof to provide a sensed signal. Moreover the sensor includes an interferometer for providing one or more output signals, and signal conveyance optics for conveying the sensed signal and the reference signal to the interferometer. The directional optics is configured for directing the sensing fraction such that at least a part of the sensing fraction is reflected by the probe tip such as to form the reflected fraction.

17 Claims, 8 Drawing Sheets

(56) References Cited

U.S. PATENT DOCUMENTS

| | | | |
|---|---|---|---|
| 2009/0021747 A1* | 1/2009 | Kawasaki | G01Q 20/02 356/501 |
| 2010/0067021 A1* | 3/2010 | Danzebrink | G01B 9/02031 356/493 |
| 2011/0167525 A1* | 7/2011 | Humphris | G01B 11/0608 850/33 |
| 2016/0025771 A1 | 1/2016 | Erickson et al. | |
| 2019/0383774 A1* | 12/2019 | Sadeghian Marnani | G01N 29/2418 |

OTHER PUBLICATIONS

David A. Brown et al., "A Symmetric 3x3 Coupler Based Demodulator for Fiber Optic Interferometric Sensors," Optomechatronic Micro/Nano Devices and Components III, SPIE, vol. 1584, Fiber Optic and Laser Sensors, pp. 328-335, XP002657535 (Dec. 1, 1991).

European Patent Office, International Search Report in corresponding International Application No. PCT/NL2018/050316, dated May 14, 2018 (3 pages).

Andrew D.L. Humphris et al., "High Speed Nano-Metrology," Review of Scientific Instruments, vol. 82, No. 4, 043710, pp. 043710-1 to 043710-5 (Apr. 28, 2011) XP012146352.

European Patent Office, Examination Report in corresponding European Application No. 18731203.8 dated Aug. 4, 2021 (6 pages).

* cited by examiner

SCANNING PROBE MICROSCOPY SYSTEM FOR AND METHOD OF MAPPING NANOSTRUCTURES ON THE SURFACE OF A SAMPLE

CROSS-REFERENCE TO RELATED APPLICATIONS

This patent application is a U.S. National Phase of PCT International Application No. PCT/NL2018/050316, filed May 14, 2018, which claims priority to European Application No. 17171030.4, filed May 15, 2017, which are both expressly incorporated by reference in their entireties, including any references contained therein.

FIELD OF THE INVENTION

The present invention is directed at a scanning probe microscopy system for mapping nanostructures on the surface of a sample, comprising a sample support structure for supporting the sample, a scan head including a probe comprising a cantilever and a probe tip arranged on the cantilever, and an actuator for scanning the probe tip relative to the sample surface for mapping of the nanostructures, further comprising an optical source for providing an optical signal, and a sensor unit for obtaining a sensor signal indicative of a position of the probe tip during scanning. The invention is further directed at a method of mapping nanostructures on the surface of a sample using such system.

BACKGROUND

A scanning probe microscopy device serves to map nanostructures on a sample surface of a sample. Such a device may comprise a probe for scanning the surface of an object, and one or more motion actuators for enabling motion of the probe relative to the sample. In one embodiment a probe comprises a probing tip mounted on a cantilever arranged for bringing the probing tip in contact with or in close proximity to the sampling surface for enabling the scanning, and a Z-position detector for determining a position of the probing tip along a Z-direction when the probing tip is in contact with the sample surface (herein the Z-direction is a direction transverse to the sample surface).

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, measurements with a microscopic probe may be used for critical metrology (CD-metrology), profilometry, particle scanning and defect review, stress- and roughness measurements. AFM microscopy allows visualization of surfaces at very high accuracy, enabling visualization of surface elements at sub-nanometer resolution.

The very high resolution and accuracy of a microscopic probe however comes at the cost of performance in terms of throughput. Throughput scales with the ratio of object area and the area of the smallest details that can be resolved with the microscopic probe. For object of macroscopic dimensions this results in significant processing time, which may be unrealistic or at least cumbersome for practical use and altogether incompatible with on line use in manufacturing processes. Therefore, to satisfy demands of industry, an increase of performance in terms of both accuracy and throughput is desired.

SUMMARY OF THE INVENTION

It is an object of the present invention to overcome the disadvantages described above, and to provide a scanning probe microscopy system and method providing increased performance in terms of throughput, accuracy and footprint.

To this end, there is provided herewith a scanning probe microscopy system for mapping nanostructures on the surface of a sample, comprising a sample support structure for supporting the sample, a scan head including a probe comprising a cantilever and a probe tip arranged on the cantilever, and at least one actuator for scanning the probe tip relative to the sample surface for mapping of the nanostructures, further comprising an optical source for providing an optical signal, and a sensor unit for obtaining a sensor signal indicative of a position of the probe tip during scanning, wherein the sensor unit includes: a partially reflecting element, configured to reflect a reference fraction of the optical signal for providing a reference signal, and to transmit a sensing fraction of the optical signal; directional optics configured for directing the sensing fraction as an optical beam towards the probe tip, and configured for receiving a reflected fraction of the optical beam such as to provide a sensed signal; an interferometer for enabling the sensed signal to interfere with the reference signal for providing one or more output signals via one or more outputs, and signal conveyance optics for conveying the sensed signal and the reference signal to the interferometer; wherein the directional optics is configured directing the sensing fraction such that at least a part of the sensing fraction is reflected by the probe tip such as to form the reflected fraction.

The system of the present invention enables to directly measure both the dynamic behavior of the probe tip as well as the static behavior of the probe and probe tip, using only a single sensor with a compact design. The wording 'dynamic behavior of the probe tip' refers to any motion of the probe tip caused by bending of the cantilever during scanning of the surface of the sample. With the term 'static behavior of the probe and probe tip' any motion of the whole probe, including cantilever and probe tip, is meant. It is important to distinguish between these two types of behavior. It is the static behavior of the probe, thus the motion of the probe induced by operating the piezo type transducers that move the probe to and from the surface (i.e. in the z-direction), from which the surface topography may be derived. However, the dynamic behavior of the probe (e.g. in tapping mode) provides the motion information from which any changes in height of the surface can be derived, and which is therefore used as input to drive the piezo type transducers to modify the z-position of the probe. It is to be understood that in contact mode when the (non-vibrating) probe encounters an increase or decrease in height, the deflection signal of the probe tip will change (the deflection is either limited by encountering a height increase or is released by a height decrease) and the system uses this information to correct the z-position of the probe until the previous deflection signal is again obtained (feedback). In non-contact mode the probe is vibrated above the surface near it's resonance frequency. Deflection and the resulting output signal are influenced by the tip-surface interaction, and any height changes likewise result in a change in of the output signal that may be compensated for in feedback. The dynamic behavior of the vibrating probe tip also changes dependent on the stiffness of the sample surface. For example, for semiconductor applications dynamic modes are preferred or even required. In that case the mechanism is not a mechanical limitation, but a change in stiffness between the probe and the surface due to distance-dependent force between the probe and the surface. This change in stiffness changes the resonance frequency of the cantilever-probe system. When exciting at a fixed frequency (the dither frequency), the responding amplitude will vary if the resonance frequency changes. Compensating for this change in feedback mode and registering the probe's z-position above the surface will provide the desired information for imaging and detection.

Various other measurement modes may be applied in combination with the present invention that are not further described here in detail. For example, the present invention may be applied in combination with acoustic type AFM measurements e.g. to obtain sub-surface information. Such methods for example include ultrasonic AFM (UAFM) or heterodyne force microscopy (HFM) at acoustic frequencies in the megahertz and gigahertz range, based on surface elastic interaction and/or scattering of an acoustic signal at or in a sample.

The present invention applies a common path type optical sensor device that provides a common path reference signal and sensed signal, and wherein a sensed fraction is transmitted to the probe tip whereas a reflected fraction thereof is received by the same directional optics to provide the sensed signal. The invention is thereby based on the insight that by doing so, an interferometer may be applied to directly measure the absolute distance between the directional optics of the sensor and the exact position of the probe tip. From the output signal of the interferometer, both the static behavior and the dynamic behavior is therefore derivable. This may be achieved, for example, by analyzing the output signal in a certain frequency range associated with either one of the static and dynamic behavior. For example, all signal components below 2 kilohertz (kHz) may be associated with static behavior, whereas all signal components above 2 kHz may relate to dynamic behavior. A threshold frequency may thus be applied to identify the signal component as being associated with static or dynamic behavior, the threshold for example being within a range of 1 kilohertz to 10 kilohertz, preferably within a range of 1 kilohertz to 5 kilohertz, more preferably at or around 2 kilohertz. In accordance with some embodiments, either one of low pass filters, high pass filters or band pass filters may be applied to separate out a particular frequency range for further analysis of either the static or dynamic behavior. Such filter may apply first and second filter frequencies, e.g. set at the abovementioned threshold or at particular frequency values relating to particular signal components. Moreover, in some embodiments, digital processing allows to analyze the output signal in certain frequency ranges. Such signal processing may apply fast Fourier transforming (FFT) or a different digital processing technique to analyze certain frequency components. Moreover, combinations of analogue and digital processing may be applied. In principle, one of the advantages of the system of the present invention is that it enables the application of analogue signal processing techniques, which are fast and robust.

The manner of determining the distance from the partially reflective element or directional optics to the probe tip and back, may performed via the interferometer using known methods that are based on determining the path length difference by analysis of a phase difference between the reference signal and the sensed signal. To this end, a calibration of the system may be performed first, e.g. at the start of the measurement, after which the path length difference may be monitored by keeping count of the number of full cycles of phase change (i.e. each cycle representing a 2n phase change). Other methods may be applied as well.

In some particular embodiments, the signal conveyance optics is arranged for conveying the reference signal and the sensed signal as a mixed signal to the interferometer, and wherein the signal conveyance optics comprises: one or more splitting elements for splitting the mixed signal in a plurality of further mixed signals; and one or more optical elements for establishing an optical path difference between two or more of the further mixed signals.

In other embodiments, the interferometer may be configured for providing multiple mixed signals of different path lengths. For example, in other embodiments, the interferometer comprises an N-way coupler, wherein N is at least three, comprising a first side with N first terminals and a second side with N second terminals, wherein each one of the N first terminals is connected to one of the N second terminals by an optical conveyor such as a fiber, the optical conveyors being optically coupled for mutually exchanging optical signals conveyed by each conveyor, wherein each of at least two of the second terminals on the second side is connected to an optical fiber path of a unique optical path length such as to establish an optical path difference between the optical signals provided through said at least two second terminals, the optical elements further comprising a reflector element for returning an output signal through the first terminals at the first side, the first terminals thereby providing the one or more outputs of the interferometer.

The abovementioned embodiments applying multiple mixed signals of different path lengths, enable to very accurately determine the distance variation across a large range of distances. The common path architecture eliminates effects of differences in temperature or mechanical variation of the paths. Nevertheless, variation of the common path may still affect sensing results in a conventional interferometer. Basically, the interference intensity as a function of distance to the target is the sum of a constant term and a periodic term, the phase position in this period depending on a ratio between the distance and the wavelength. By counting the number of periods, wavelength accuracy is possible. The distance could be determined with sub-wavelength accuracy from the intensity obtained from the common path architecture and hence the phase measurement, when the amplitudes of the constant term and the periodic term would be known. However, variation of the common path affects these amplitudes, and hence the determination of the distance. In the common path architectures described in the above embodiments, sub-wavelength accurate path length difference measurement is possible due to the fact that different paths are coupled to different inputs of a three way coupler. This can be done across a large range of distances, hence enabling a highly accurate and direct measurement of the distance to the probe tip.

In accordance with a second aspect of the invention, there is provided a method of performing scanning probe microscopy using a scanning probe microscopy system according to any one or more of the preceding claims, the system comprising a sample support structure for supporting the sample, a scan head including a probe comprising a cantilever and a probe tip arranged on the cantilever, and at least one actuator for scanning the probe tip relative to the sample surface for mapping of the nanostructures, the system further comprising an optical source for providing an optical signal, and a sensor unit for obtaining a sensor signal indicative of a position of the probe tip during scanning, comprising the steps of: reflecting, using a partially reflecting element, a reference fraction of the optical signal for providing a reference signal; and transmitting, using the partially reflecting element, a sensing fraction of the optical signal; directing, using directional optics, the sensing fraction as an optical beam towards the probe tip, and receiving with the directional optics a reflected fraction of the optical beam such as to provide a sensed signal; conveying, using signal conveyance optics, the sensed signal and the reference signal to an interferometer; and interfering, using the interferometer, the sensed signal with the reference signal for providing one or more output signals provided via one or more outputs; wherein the step of directing the sensing fraction is performed by the directional optics such that at least a part of the sensing fraction is reflected by the probe tip such as to form the reflected fraction received by the directional optics.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
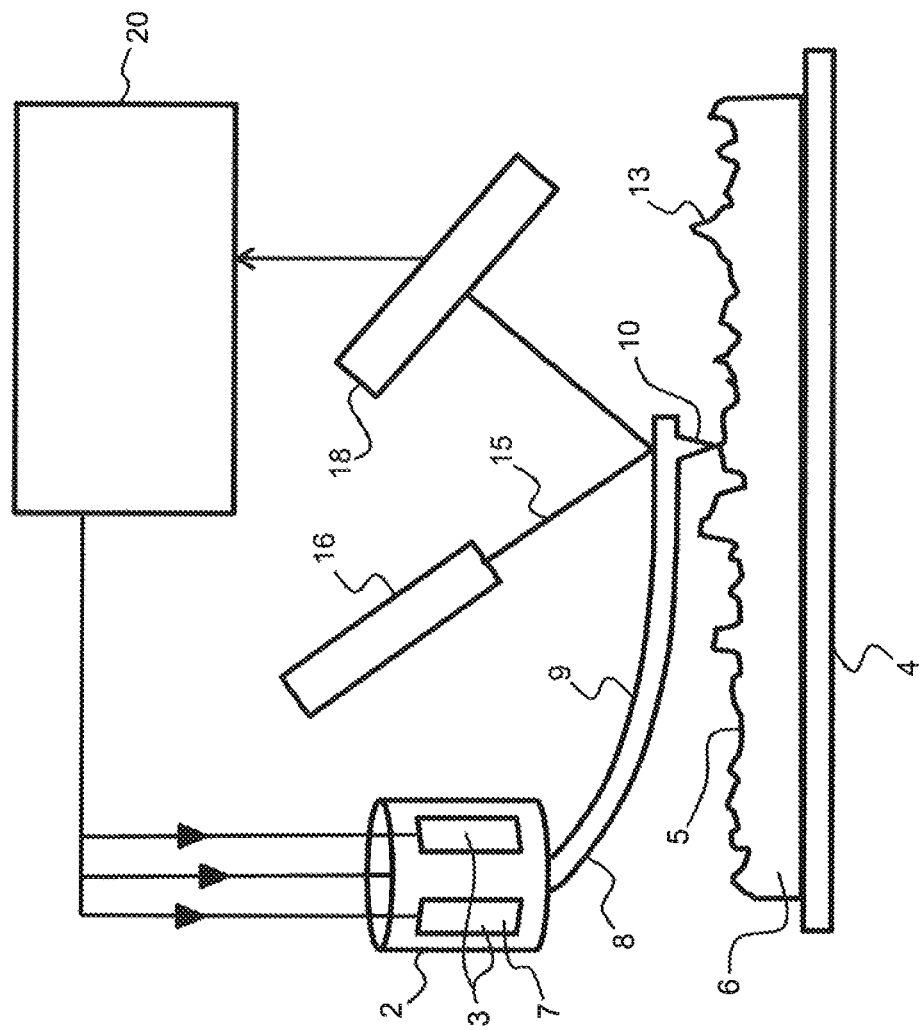
FIG. 1 schematically illustrates an atomic force microscopy system including a conventional optical beam deflection type sensor unit.

FIG. 1 schematically illustrates the working principle of a typical prior art atomic force microscope. In FIG. 1, a probe head 2 comprises piezo type drivers 3 for the X-, Y-, and Z-directional motion of a probe 8. The probe 8 consists of a cantilever 9 having a probe tip 10 arranged for scanning a sample surface 5 of a sample 6. During scanning, a dither piezo 17 (not shown in FIG. 1) or other means of actuations such as photo-thermal actuation, electrostatic, etc., may drive the cantilever in vibrational mode (for example close to resonant frequency) to enable tapping of the probe tip on the surface. The manner of applying a vibrational motion to the probe tip is known to the skilled person.

Scanning of the sample surface 5 is performed by moving the probe tip 10 in the X- and Y direction parallel to the sample surface 5 (or alternatively, by moving the substrate surface in the X- and Y-directions while maintaining the position of the probe tip fixed in the X- and Y-directions). The probe tip 10 is brought in close proximity to the surface 5 by means of Z-directional piezo driver 7. Once in the position, the probe tip 10 is vibrated in the Z-direction using the dither piezo 17 such that it repeatedly touches the surface 5 during scanning. The system uses an optical beam deflection (OBD) type sensor unit to monitor the probe's vibrational motion, i.e. it's dynamic behavior. To this end, a laser 16 illuminates the probe tip with laser beam 15. The precise position in the Z-direction is determined using photo diodes 18 which receive the reflected laser beam 15. For example, photo diodes 18 may form a four quadrant photo diode array, which allows to monitor the dynamic behavior by analyzing the received optical fractions of each quadrant. The laser 16 and photo diodes 18 may (although this is not always the case, and also not essential) move up and down with the probe 8, and the Z-directional static motion (i.e. the non-vibrational component from which the surface topography can be derived) is typically determined indirectly from the feedback signal that drives the piezo type driver 7. In particular, upon encountering any height or stiffness changes, the dynamic behavior changes (e.g. the deflection of the probe tip is limited by a height increase or alternatively it is further released due to a height decrease). The control system 20 will responsively drive the piezo driver 7 to adjust the height until the previous state is restored and the dynamic signal is again equal to what it was before. From the feedback signal provided to driver 7 to adjust the height, this height adjustment can be accurately determined. The probe 8 then moves on to the next scanning position.

The sample surface 5 is carried using a sample carrier 4. Driving of the piezo drivers 3 located on the probe head 2 is performed using the detector and feedback electronics 20. At the same time, the detector and feedback electronics 20 receive the detected z position as determined using photo diodes 18. This principle allows for very precise mapping of surface elements, such as surface element 13 on the surface 5 of the sample 6. Atomic force microscopy performed e.g. using a technique as illustrated in FIG. 1 allows the mapping of very small structures and features on the surface, e.g. nanostructures having typical nanometer dimensions (e.g. even <1 nm, such as for example individual polymer strings being as thin as 0.4 nm). As described herein above, since the mapping of the surface has to be performed with great precision, the speed at which the method is performed is rather slow.

The present invention, however, is not limited to atomic force microscopy, but may also be applied in combination with other scanning probe microscopy methods and/or processes for modification of such small scale surface features. As will be further explained below, the present invention improves the performance of a scanning probe microscopy system, such as an atomic force microscope, at least in terms of accuracy, throughput and footprint (size).

Figure 2:
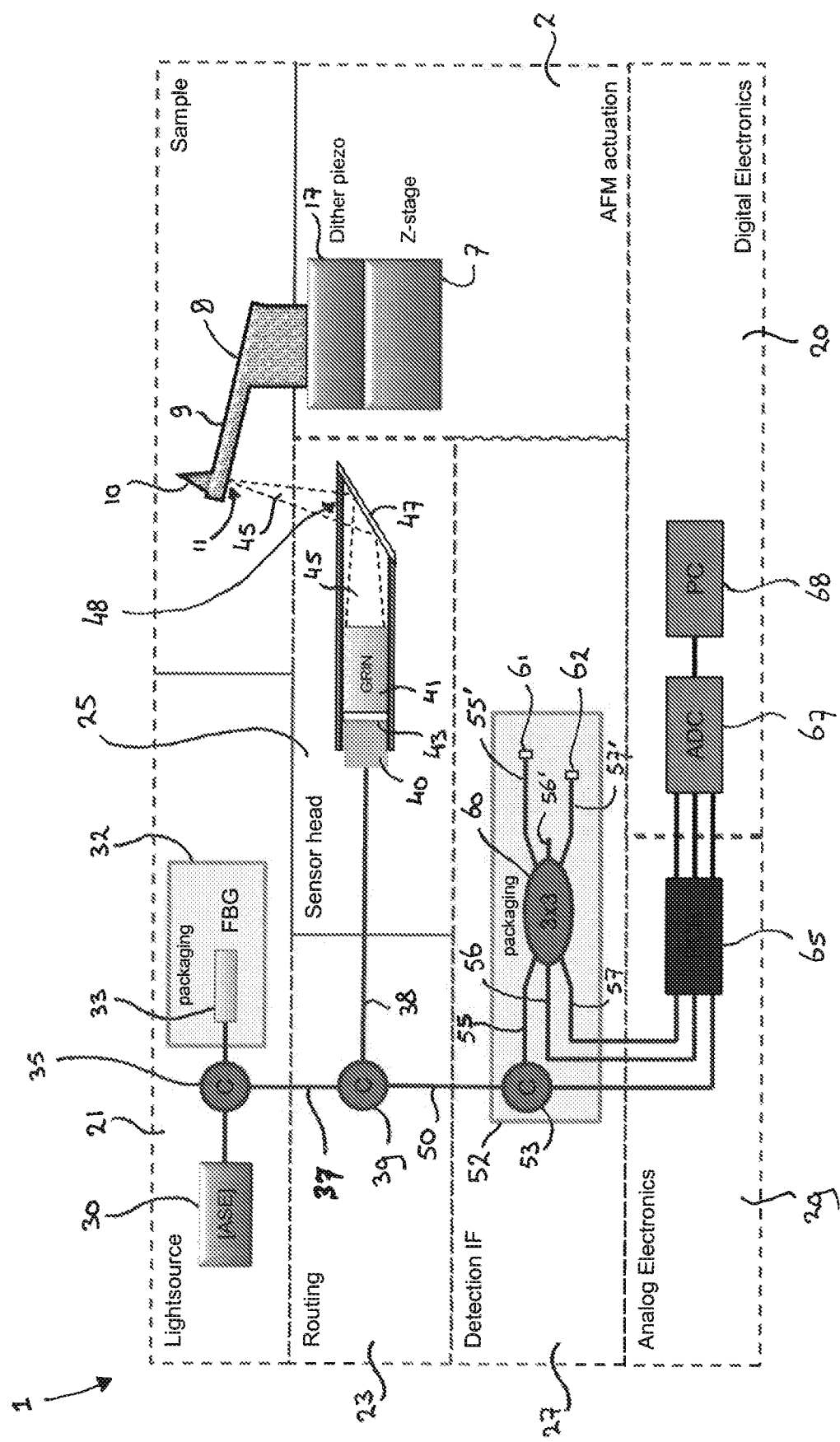
FIG. 2 provides a schematic system overview of a scanning probe microscopy system in accordance with the present invention.

FIG. 2 schematically illustrates a system overview of a scanning probe microscopy system in accordance with an embodiment of the present invention. The system 1 comprises a number of similar elements as were already described hereinabove with respect to the system illustrated in FIG. 1. For example, a system 1 includes the probe 8 with cantilever 9 and probe tip 10, a Z-directional piezo type driver 7, a dither piezo 17, as well as a control system 20. At least the probe 8 and piezo drivers 7 and 17 (including some further piezo drivers 3, similar as in the system of FIG. 1) are located on the probe head or scan head 2. The sensor unit for determining probe tip motion is different as will be described. In particular, the system comprises a light source 21, which consists of an optical emitter 30 (amplification by stimulated emission (ASE), such as a laser), a circulator 35 and a package 32 including a fiber Bragg grating (FBG) 33.

The FBG 33 enables the light source 21 to provide light of a selected small wavelength band by reflecting only corresponding frequencies of the optical signal back to the circulator 35. The circulator 35 is a clockwise circulator that causes any incoming signal to be transmitted via the next output in clockwise direction. Thus, the optical signal having a wavelength in accordance with the frequencies selected by the FBG 33 is transmitted onto fiber 37 in direction of clockwise circulator 39. The optical signal is then transmitted through fiber 38 towards the sensor head 25.

In sensor head 25, fiber 38 terminates in section 40. The sensor 25 further comprises a graded index fiber 41 and a partially reflecting element 43 between section 40 and fiber 41. The graded index fiber 41 serves as a lens that allows to provide an optical beam 45 having a desired cross section and focal point. Partially reflect element 43 reflects a reference fraction of the optical signal back towards fiber 38. A sensing fraction is transmitted by partially reflective element 43. The sensing fraction passes through the graded index fiber 41 forming optical beam 45 which is directed by reflective element 47 towards the probe tip 10. Graded index fiber 41 and reflective element or mirror 47 form the directional optics that directs the optical signal towards the probe tip 10. Near the probe tip 10 on the back of the cantilever 9, more or less at the position indicated by arrow 11, a specular reflective surface on the probe 8 may be present that reflects at least the part of the received incident beam 45. A fraction thereof, the reflected fraction, will be incident again on the sensor head 25 via the detector aperture and mirror 47. This reflected fraction which reaches a sensor head 25 provides the sensed signal, which is passed on together with the reference signal via fiber 38. In circulator 39, the mixed signal received via fiber 38 is passed on via fiber 50 towards the interferometer 27. Element 23 may generally be referred to as signal conveyance optics 23.

Although various types of interferometers may be applied in combination with a system of the present invention, the interferometer 27 illustrated in FIG. 2 is a special type of interferometer. The functional parts of interferometer 27 are located in package 52. The interferometer comprises an N-way coupler 60, which is in the embodiment illustrated a 3×3 coupling element 60. The 3×3 coupler 60 comprises a plurality of first terminals 55, 56 and 57 on a first side thereof. The coupler 60 comprises a plurality of second terminals 55', 56' and 57' at a second side thereof. In the embodiment illustrated, terminal 55' is directly connected via the coupler 60 to terminal 55, terminal 56' is directly connected via the coupler 60 to terminal 56, and terminal 57' is directly connected, via the coupler 60, to terminal 57. Within the coupler 60, a transmission path provided by optical conveyers of the coupler (e.g. fibers) are optically coupled such as to allow mutual exchange of optical signals conveyed by each conveyer. Of the terminals 55', 56' and 57' on the second side of the coupler 60, terminals 55' and 57' provide an optical path which is terminated by a reflector 61 and 62 respectively. The optical path length of 55' is larger than the optical path length of 57'. Therefore, there will be a phase difference between the optical signals that are returned by the reflectors 61 and 62 and which are received by coupler 60. Preferably, although this is certainly not essential, this phase difference between the optical signals returned via terminals 55' and 57' is equal to approximately 2π/3. Moreover, preferably the phase difference between the signals returned via each one of second terminals 55' and 57 and the incoming signal via terminal 55 is also equal to 2π/3. The fully outbound signals having a mutual phase difference of 2π/3 between each one of the signals will be provided to analog signal processing circuit 65. Analog signal processing circuit 65 may be a circuit as will be described in relation to FIG. 5 further below. Thereafter, the signals are provided to the digital electronics or control system 20. The control system 20 may for example comprise an analog to digital convertor 67 and a processing circuit or personal computer 68. Although this is not illustrated in FIG. 2, control circuit 20 may drive the Z stage or piezo driver 7 using a feedback signal.

By directly sensing both the dynamic behavior and the static behavior of the probe, indirect measurement via the feedback signal to the Z-directional piezo driver 7—as is typically performed in some conventional systems—is no longer necessary. This conventional indirect measurement of the static behavior adds to the inaccuracy for example due to the fact it is non-linear (note that hysteresis of the piezo driver renders the signal to be non-linear and dependent on the direction of change).

Moreover, the performance is further increased due to the fact that the manner of determining the height adjustment is much faster than the conventional indirect method. The height changes may be obtained immediately from the sensor signal indicative of probe tip motion.

Furthermore, the sensor unit itself is smaller than the conventional OBD type sensor devices. For beam deflection, an optical source and optical receiver are required which are located in different locations for sending the incident beam and detecting the reflected beam. The present sensor unit uses a single sensor head 25 at one location and an interferometer 27. The interferometer 27 may be located on the scan head, but advantageously to reduce the size of the scan head, the interferometer 27 may be located exterior to the scan head. Therefore, the scan head itself can be much smaller in size, thereby allowing more scan heads to be applied adjacent each other in a multiple scan head system for industrial use. This further enables to increase system performance.

Figure 3:
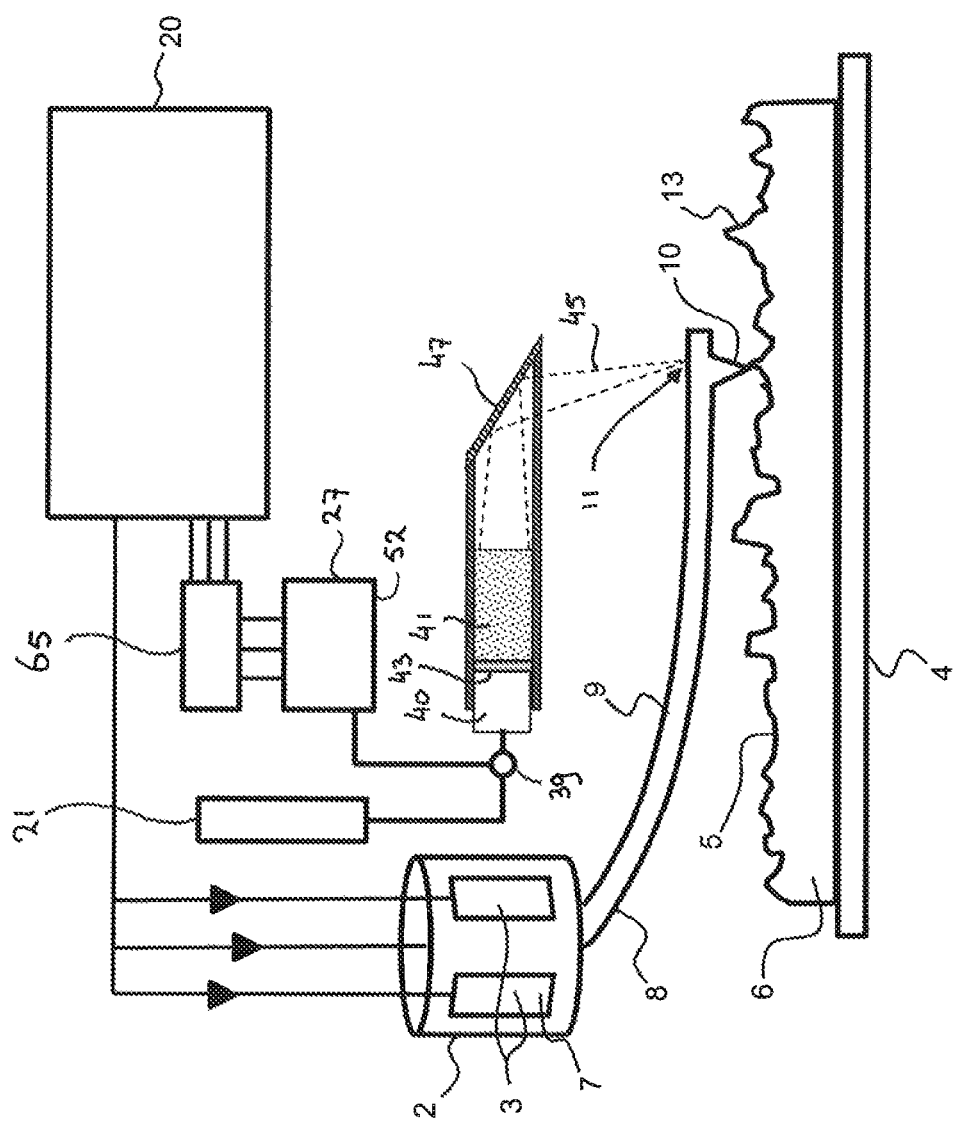
FIG. 3 schematically illustrates a scanning probe microscopy system in accordance with an embodiment of the invention.

A scan head and system in accordance with an embodiment of the present invention is schematically illustrated in FIG. 3. The reference numerals in FIG. 3 have been described hereinabove in relation to FIG. 2, and refer to the same or similar elements. In particular, it is noted that because the sensor unit 25 of the present invention enables to directly measure both the dynamic behavior of the probe 8 as well as the static behavior of the probe 8, the detection elements 40, 41, 43 and 47 will not move along in the Z direction together with the probe 8. Instead, these detector elements are fixed relative to the metrology loop of the system such as to enable absolute measurement of the static behavior of the probe tip 10 in addition to the dynamic behavior of the probe.

Moreover, in FIG. 2, element 39 has been described as a circulator operating by means of clockwise rotation. As follows from FIG. 3, in this embodiment the circulator 39 must operate in anti clockwise rotation in order to pass on the sensed signal and reference signal towards the interrogator 27.

Figure 4C:
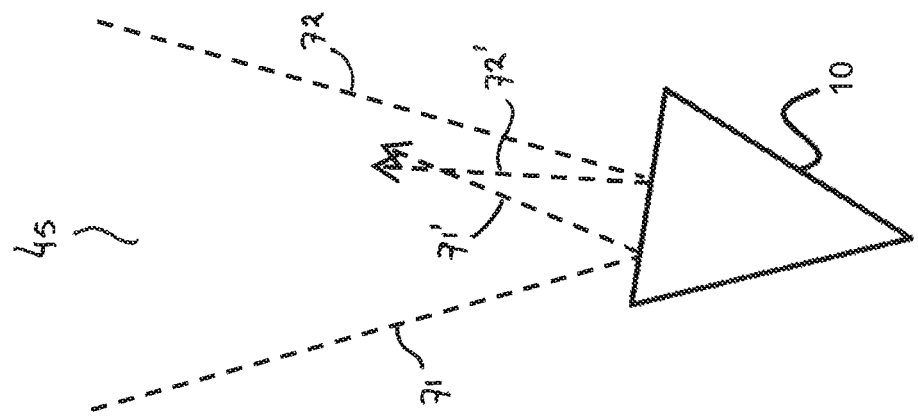
FIGS. 4A to 4C schematically illustrate reflection at a probe tip using a focused optical beam and a sensor unit having a suitable detector aperture.
Figure 4B:
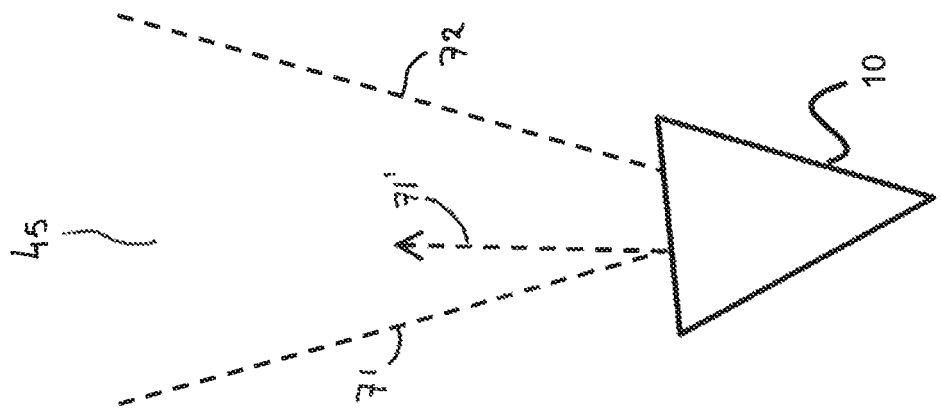
Figure 4A:
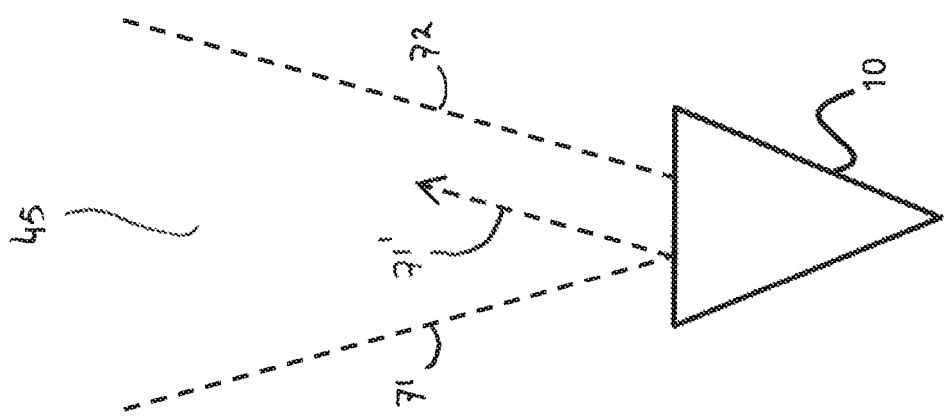

FIGS. 4A to 4C schematically illustrate how the detector aperture 48 of the sensor unit 25, the cross sectional parameter of the beam 45 and its focal point, contribute in enabling a reflected fraction of the optical beam 45 to be received by the detector. In FIGS. 4A to 4C, a probe tip 10 is schematically illustrated. In FIG. 4A, the upper phase of the probe tip 10 is horizontally orientated, and beam 45 is perpendicular incident on the upper phase of the probe tip 10. The focusing of optical beam 45 is exaggerated in FIGS. 4A to 4C for illustrative purposes only. In FIG. 4A, rays 71 and 72 define the outmost rays of the optical beam 45 incident on the probe tip 10. In FIG. 4A, the reflected ray 71' associated with incident ray 71 is also illustrated. As follows from FIG. 4A, the reflected ray 71' remains internal to the beam 45 following the same path back towards the detector. Therefore, like beam 45, also ray 71 will eventually reach the graded index fiber 41 of the directional optics of the detector and will be part of the reflected fraction received by the sensor unit 25. In FIG. 4B, a slide anti clock wise bending of the probe tip 10 causes the upper side of the probe tip 10 to be differently orientated with respect to the incident beam 45. Therefore, the angle of reflection of reflected beam 71' will be smaller than in the situation illustrated in FIG. 4A. However, in FIG. 4B, the reflected ray 71' stays within the path travelled by optical beam 45, and will therefore likewise reach the detector elements of the sensor unit 25. Therefore, also in the orientation illustrated in FIG. 4B, the reflected ray 71' will be part of the reflected fraction received by the detector.

In FIG. 4C, a slide clock wise rotation of the probe tip 10 causes the angle of reflection of reflected ray 71 to be larger than compared to the situation of FIG. 4A. In fact, the angle of reflection is too large to ensure that reflected ray 71 will always reach the detector (as can be seen in FIG. 4C, dependent on the length of the optical path, reflected ray 71' may end up adjacent the graded index fiber 41 of the detector. However, in FIG. 4C also a reflected ray associated with outer most ray 72 of optical beam 45 is illustrated. The reflected ray 72' associated with out most ray 72 will have an angle of reflection that is smaller than in the situation illustrated in FIG. 4A. Therefore, the ray 72' will stay within the optical path travelled by the optical beam 45 all the way back towards the detectors elements, and will thus be received via the graded index fiber 41 of the detector. Hands in the situation of FIG. 4C, optical ray 72' will be part of the reflected fraction while optical ray 71' may not be part of the reflected fraction. As follows from FIGS. 4A to 4C, by providing a focused optical beam having a carefully selected beam diameter, the system can be optically set up such that a reflected fraction of the probe tip 10 will be received by the detector under all operational conditions during scanning.

Figure 5:
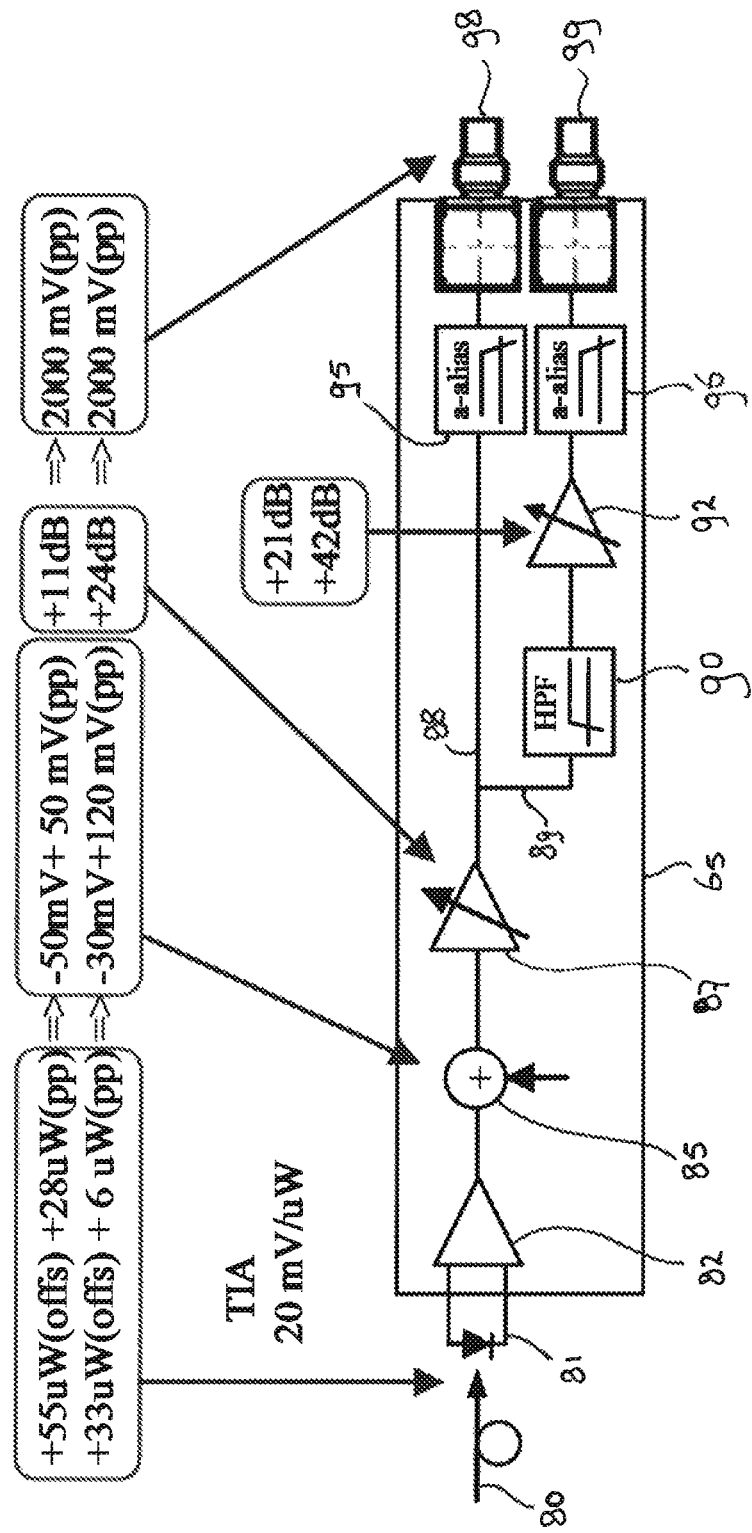
FIG. 5 schematically illustrates an analogue signal processing circuit.
Figure 6A:
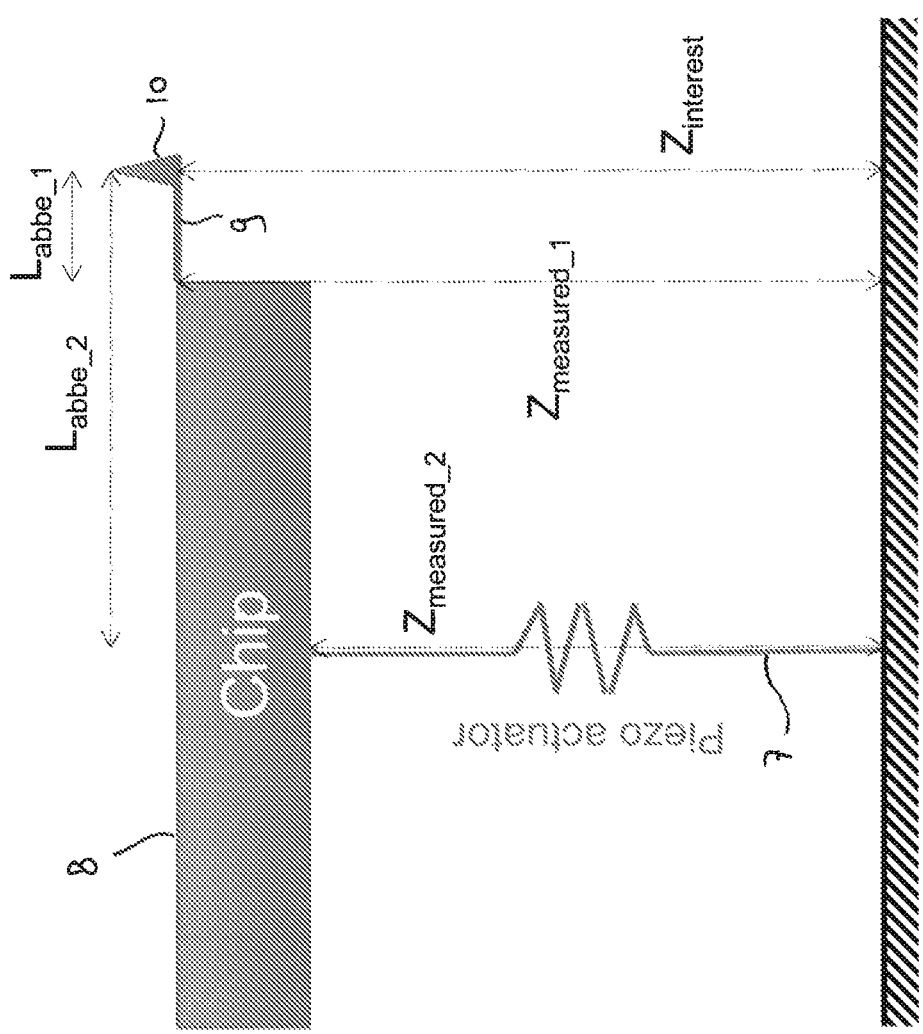
FIGS. 6A and 6B schematically illustrate the principle of Abbe error for a probe of an atomic force microscope.
Figure 6B:
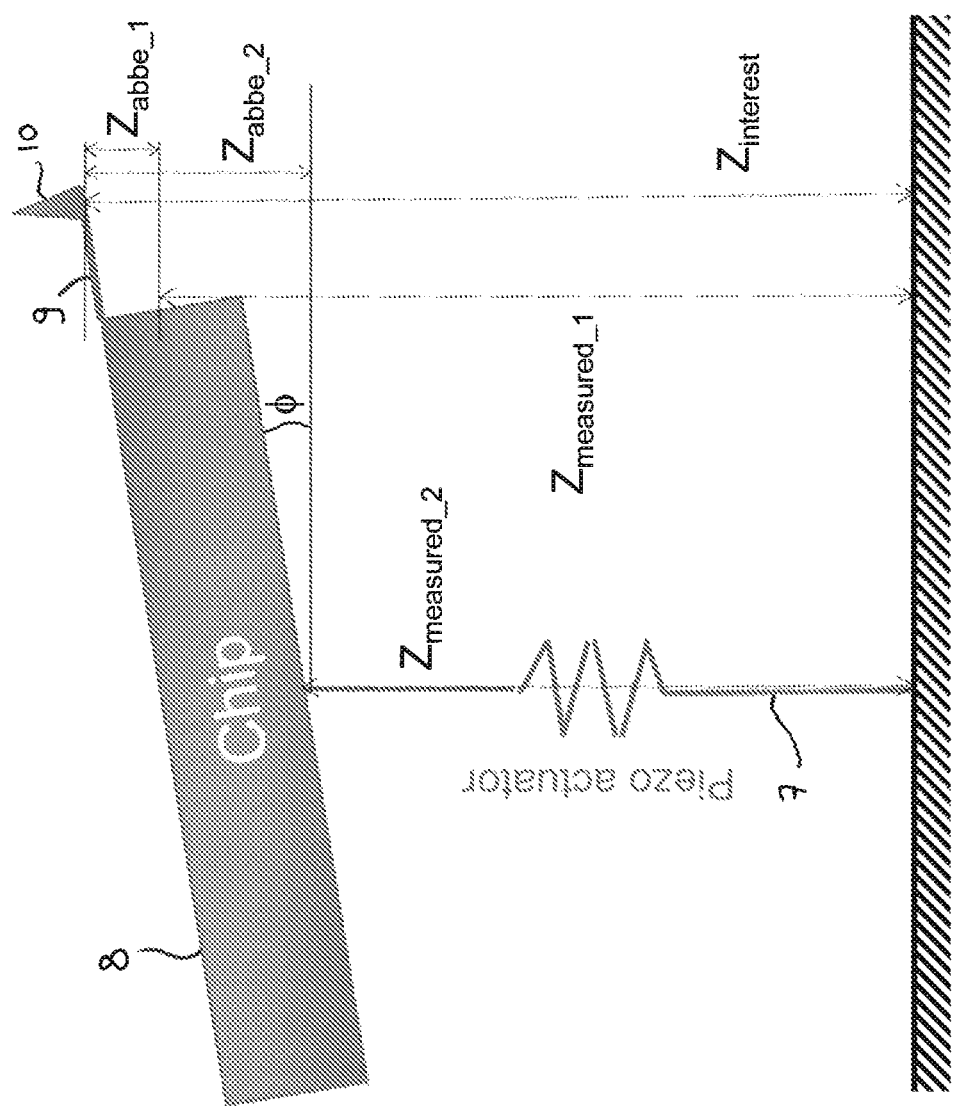

FIG. 5 schematically illustrates an analog signal processing circuit that may be used in the system of FIG. 2. In FIG. 5, optical input 80 provides an optical signal to photodiode 81 which is pre-amplified in element 82. An offset is added in element 85 and a further amplification takes place in variable gain 87. Thereafter, the signal is provided via a first branch 88 towards anti aliasing element 95, after which it is provided to the output 98. This output signal from output port 98 may be used for analyzing the static behavior of the probe, typically providing a stronger signal than the dynamic behavior. The second branch 89 of processing circuit 65 comprises a high pass filter 90 that for example transmits all signal components having a frequency larger than a certain frequency, e.g. 2 kilohertz. This signal is again amplified by amplifier 92, and provided to anti aliasing unit 96 and output port 99. The signal from output port 99, which no longer comprises the signal components below the filter frequency of high pass filter 90, may be used for analyzing the dynamic behavior of the probe. FIGS. 6A and 6B schematically illustrate the principle of other error causing inaccuracy of a measured distance for example in a conventional system. In FIG. 6A, the distance of interest is measured by a detector is indicated by $Z_{interest}$. This is the distance between the metrology frame (or any fixed point thereto) and the probe tip 10. FIG. 6A also illustrated piezo actuator 7 that drives the probe head. Typically, the static behavior that is measured in the indirect measurement technique is Z measured_2 in FIG. 6A. In case of any bending of the probe 8 due to a vibrational signal provided via dither piezo, such bending will occur in the last part of the probe, i.e. cantilever 9. The other error introduced in a measurement of this type is two fold: a first part of the other error is caused by the bending of the cantilever 9, and a second part of the other error is provided by any inaccuracy between the point of engagement of the piezo actuator and the probe tip 10. The inaccuracy caused by the first part of the other error, associated with bending of the cantilever 9, is dependent on the characteristic upper length $L_{abbe\_1}$ illustrated in FIG. 6A. The upper length characteristic for the second part of the other error is provided by the distance between the probe tip 10 and the projection of the engagement point of the piezo actuator, in FIG. 6 indicated by $L_{abbe\_2}$. FIG. 6B makes the other error more clear. If the static behavior of the probe is measured by measuring the Z position provided through piezo actuator 7 in the engagement point thereof, a slide deviation of the probe with angle Φ will be amplified by the characteristic other length $L_{abbe\_2}$. The other error in the measurement is therefore indicated in FIG. 6B by $Z_{abbe\_2}$. Likewise, any additional bending of the cantilever 9 will provide a further other error equal to $Z_{abbe\_1}$, dependent on the bending parameters and the other length $L_{abbe\_1}$. By measuring the distance by $Z_{interest}$ directly using the method of the present invention, the other error may be completely eliminated or greatly diminished. Therefore, the accuracy of the measurement is improved.

Figure 7:
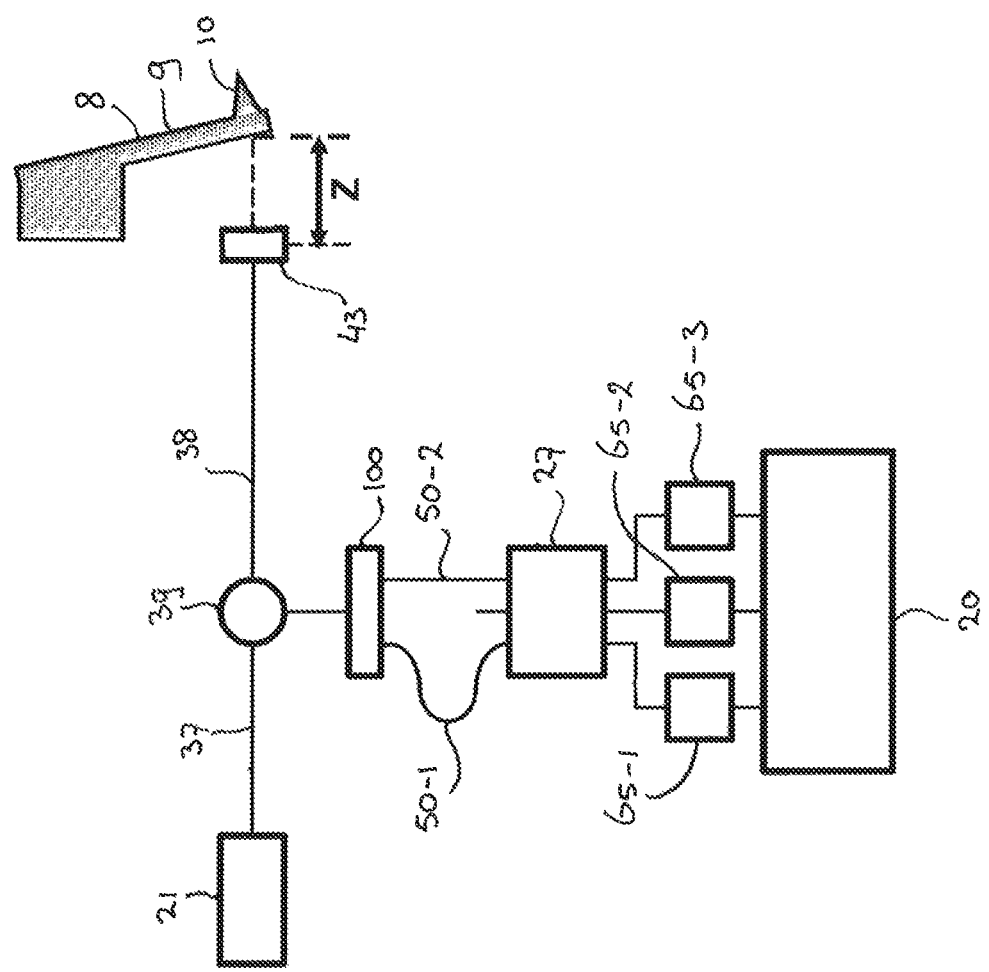
FIG. 7 schematically illustrates an alternative embodiment of a sensor unit including interferometer useable with the present invention.

FIG. 7 illustrated a different embodiment of a sensor, and the interferometer 27 and signal conveyance optics in accordance with an embodiment of the invention. Again, in FIG. 7, an optical source 21 provides via fiber 37, circulator 39 and fiber 38, an optical signal to the partial reflected element 43 of a detector. A reference signal is reflected back from partial reflective element 43 towards the circulator 39, whereas another part, the sensing fraction, will be transmitted to the probe tip 10 and back. The reference signal and the sensed signal are provided via fiber 38 towards circulator 39 which passes these signals onto splitter 100 of the second conveyance optics. Splitter 100 splits the mixed signal received from circulator 39 into a first mixed signal and a second mixed signal, which are transmitted via a first branch 50-1 and a second branch 50-2 towards interferometer 27. Here, an optical path length difference between the optical paths 50-1 and 50-2 will provide the phase difference required for accurately determining the position of the probe tip 10. A first and a second mixed signal is provided via the first and the second branch 50-1 and 50-2 respectively towards the interferometer 27, after which analog signal processing circuits 65-1, 65-2 and 65-3 convert the optical signals into electronic signals from which the probe tip behavior of probe tip 10 can be accurately determined by control system 20.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A scanning probe microscopy system for mapping nanostructures on the surface of a sample, comprising:
   a sample support structure for supporting the sample,
   a scan head including a probe comprising a cantilever and a probe tip arranged on the cantilever,
   an actuator for scanning the probe tip relative to the sample surface for mapping of the nanostructures,
   an optical source for providing an optical signal, and
   a sensor unit for obtaining a sensor signal indicative of a position of the probe tip during scanning, the sensor unit comprising a sensor head that is a single element including:
      a partially reflecting element, configured to:
         reflect a reference fraction of the optical signal to provide a reference signal, and
         transmit a sensing fraction of the optical signal; and
      a directional optics configured for:
         directing the sensing fraction as an optical beam towards the probe tip, and
         receiving a reflected fraction of the optical beam to provide a sensed signal, such that at least a part of the sensing fraction is reflected by the probe tip to form the reflected fraction;
   wherein the system further comprises:
      an interferometer for enabling the sensed signal to interfere with the reference signal to provide one or more output signals via one or more outputs; and
      a signal conveyance optics for conveying the sensed signal and the reference signal to the interferometer.

2. The scanning probe microscopy system in accordance with claim 1, wherein the directional optics is arranged for providing the optical beam such that the beam, near the probe tip, has a cross sectional beam area of a size sufficient to cover an operational range of positions of the probe tip during said scanning, such that at each position assumed by the probe tip, the reflected fraction returned by the probe tip is a non-zero fraction.

3. The scanning probe microscopy system according to claim 1, wherein the system further comprises at least one of the group consisting of:
   a low pass filter for filtering at least one of the output signals to filter signal components having a frequency above a first filter frequency; and
   a high pass filter for filtering at least one of the output signals to filter signal components having a frequency below a second filter frequency.

4. The scanning probe microscopy system according to claim 3, wherein at least one of the first or the second filter frequency is within a range of 50 hertz to 10 kilohertz.

5. The scanning probe microscopy system according to claim 3, wherein at least one of the first or the second filter frequency is within a range of 500 hertz to 5 kilohertz.

6. The scanning probe microscopy system according to claim 3, wherein at least one of the first or the second filter frequency is at or around 2 kilohertz.

7. The scanning probe microscopy system according to claim 1, wherein the signal conveyance optics is arranged for conveying the reference signal and the sensed signal as a mixed signal to the interferometer, and
   wherein the signal conveyance optics comprises:
      one or more splitting elements for splitting the mixed signal in a plurality of further mixed signals; and
      one or more optical elements for establishing an optical path difference between two or more of the further mixed signals.

8. The scanning probe microscopy system according to claim 7, wherein the one or more optical elements of the signal conveyance optics are provided by at least a first and second optical branch path, configured to transmit one or more of the further mixed signals, wherein the first optical branch path has a different optical path length than the second optical branch path.

9. The scanning probe microscopy system according to claim 1, wherein the interferometer comprises an N-way coupler,
   wherein N is at least three,
   wherein the N-way coupler comprises a first side with N first terminals and a second side with N second terminals,
   wherein each one of the N first terminals is connected to one of the N second terminals by an optical conveyor, the optical conveyor being optically coupled for mutually exchanging optical signals conveyed by each conveyor,
   wherein each one of at least two of the second terminals on the second side is connected to an optical fiber path of a unique optical path length to establish an optical path difference between the optical signals provided through said at least two of the second terminals, and
   wherein the optical elements further comprises a reflector element for returning an output signal through the first terminals at the first side, the first terminals thereby providing the one or more outputs of the interferometer.

10. The scanning probe microscopy system according to claim 1, wherein the one or more outputs of the interferometer are connected to a signal processor,
    wherein the signal processor comprises one or more light intensity detectors optically coupled to the one or more outputs of the interferometer, and
    wherein a signal processing circuit is coupled to the light intensity detectors and configured to determine information representing a distance traveled by the sensed signal from the partially reflective element via the directional optics and the optical beam to the probe tip and back, to measure a motion of the probe tip during said scanning.

11. The scanning probe microscopy system according to claim 1, wherein the scan head includes at least the optical source and the sensor unit, including the partially reflecting element, the directional optics, and the signal conveyance optics.

12. The scanning probe microscopy system according to claim 1, the scanning probe microscopy system being configured for performing one or more functions taken from the group consisting of:
  atomic force microscopy,
  ultrasonic force microscopy,
  heterodyne ultrasonic force microscopy,
  near-field microscopy,
  optical microscopy,
  nanometer scale manipulation, and
  micrometer scale manipulation.

13. A method of performing scanning probe microscopy using a scanning probe microscopy system that comprises a sample support structure for supporting the sample, a scan head including a probe comprising a cantilever and a probe tip arranged on the cantilever, an actuator for scanning the probe tip relative to the sample surface for mapping of the nanostructures, an optical source for providing an optical signal, and a sensor unit for obtaining a sensor signal indicative of a position of the probe tip during scanning, wherein the sensor unit comprising a sensor head that is a single element that comprises:
  a partially reflecting element, configured to:
    reflect a reference fraction of the optical signal to provide a reference signal, and
    transmit a sensing fraction of the optical signal;
  a directional optics configured for:
    directing the sensing fraction as an optical beam towards the probe tip, and
    receiving a reflected fraction of the optical beam to provide a sensed signal, such that at least a part of the sensing fraction is reflected by the probe tip to form the reflected fraction;
  wherein the system further comprises:
    an interferometer for enabling the sensed signal to interfere with the reference signal to provide one or more output signals via one or more outputs, and
    a signal conveyance optics for conveying the sensed signal and the reference signal to the interferometer, and
  wherein the method comprises:
    reflecting, using the partially reflecting element, the reference fraction of the optical signal to provide the reference signal;
    transmitting, using the partially reflecting element, the sensing fraction of the optical signal;
    directing, using the directional optics, the sensing fraction as the optical beam towards the probe tip, and receiving with the directional optics the reflected fraction of the optical beam to provide the sensed signal, such that at least a part of the sensing fraction is reflected by the probe tip to form the reflected fraction;
    conveying, using the signal conveyance optics, the sensed signal and the reference signal to the interferometer; and
    interfering, using the interferometer, the sensed signal with the reference signal to provide one or more output signals provided via one or more outputs.

14. The method according to claim 13, wherein directing the sensing fraction as an optical beams towards the probe tip comprises:
  providing the optical beam such that the beam, near the probe tip, has a cross sectional beam area of a size sufficient to cover an operational range of positions of the probe tip during said scanning, such that at each position assumed by the probe tip, the reflected fraction returned by the probe tip is a non-zero fraction.

15. The method according to claim 13, further comprising analyzing at least one of the output signals provided via the one or more outputs for determining a distance traveled by the sensed signal from the partially reflective element via the directional optics and the optical beam to the probe tip and back, such as to measure a motion of the probe tip during said scanning.

16. The method according to claim 15, wherein the step of analyzing comprises:
  analyzing the at least one output signal in a first frequency range for measuring a first displacement signal indicative of probe motion of the whole probe; and
  analyzing the at least one output signal in a second frequency range for measuring a second displacement signal indicative of probe tip motion of the probe tip relative to the scan head;
  wherein the first frequency range includes lower frequency values than the second frequency range.

17. The method according to claim 13, wherein the reference signal and the sensed signal are conveyed as a mixed signal to the interferometer, and wherein the method comprises splitting the mixed signal, by at least one of the signal conveyance optics and the interferometer, in a plurality of further mixed signals and establishing an optical path difference between two or more of the further mixed signals.

* * * * *